United States Patent
Pike et al.

(10) Patent No.: US 7,502,031 B1
(45) Date of Patent: **\*Mar. 10, 2009**

(54) AUTOMATIC COMPONENT INTERFACE CREATOR

(75) Inventors: Melissa J. Pike, Milford, MA (US); Patrick L. Edson, Newton, MA (US); Li Yang, Franklin, MA (US); Christian Portal, Holliston, MA (US); Thomas Gaudette, Jamaica Plain, MA (US)

(73) Assignee: The MathWorks, Inc., Natick, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 11/642,431

(22) Filed: Dec. 20, 2006

Related U.S. Application Data

(63) Continuation of application No. 10/761,888, filed on Jan. 20, 2004, now Pat. No. 7,165,253.

(51) Int. Cl.
*G06T 15/00* (2006.01)
(52) U.S. Cl. .................. 345/589; 715/716; 715/717; 712/32; 718/102
(58) Field of Classification Search ................. 345/589; 715/716, 717; 712/32; 707/101, 102; 717/125, 717/141, 114; 718/102
See application file for complete search history.

(56) References Cited

U.S. PATENT DOCUMENTS

| 7,055,067 | B2 * | 5/2006 | DiJoseph ..................... 714/38 |
| 7,165,253 | B1 * | 1/2007 | Pike et al. ................... 718/102 |

OTHER PUBLICATIONS

IVI - Interchangeable Virtual Instruments: IVI-3.1: Driver Architecture Specification. IVI Foundation, Aug. 22, 2003 Edition, pp. 1-111.
VXI Plug & Play Systems Alliance: VPP-4.3: The Visa Library. VXI Plug & Play Systems, Mar. 17, 2000, pp. 1-285.
VXI Plug & Play Systems Alliance: VPP-4.3.2: Visa Implementation Specification for Textual Languages. VXI Plug & Play Systems, Mar. 17, 2000, pp. 1-84.

\* cited by examiner

*Primary Examiner*—Phu K Nguyen
(74) *Attorney, Agent, or Firm*—Lahive & Cockfield, LLP; Kevin J. Canning

(57) ABSTRACT

A cross-platform interface tool provides a common interface for any hardware or software component having some advertising mechanism listing its features, input, and output requirements. The advertising mechanism can take a number of different forms, including data, a software object definition, or a communications system. The cross-platform interface tool includes a parsing mechanism for parsing through a component description associated with at least one of the plurality of components to gather information relating to the components. A component interface creator automatically generates a component interface based on the information gathered by the parsing mechanism.

14 Claims, 13 Drawing Sheets

AUTOMATIC COMPONENT INTERFACE CREATOR

RELATED APPLICATIONS

This application is a continuation of, and claims the benefit of, U.S. patent application Ser. No. 10/761,888, filed on Jan. 20, 2004, naming the same inventors and the same assignee as this application. The disclosure of the above-mentioned application is hereby incorporated by reference herein in its entirety.

FIELD OF THE INVENTION

The present invention relates to a common programming interface, and more particularly to a tool for creating a common interface for operating a hardware component having some mechanism for advertising its features and interface requirements, independent of driver type.

BACKGROUND OF THE INVENTION

In interactive programming environments, there is often a need for the interactive programming environment to interact with existing components and applications, and those components and applications do not necessarily originate with the interactive programming environment. There are a number of different approaches utilized to enable such interaction. In many circumstances, it is necessary for a primary software application executing on a hardware component to communicate with a second hardware component (either located in the same hardware system or external), or a second software application or component executing on that hardware. For example, the primary software application can execute on a personal computer and communicate with the secondary hardware. The secondary hardware components can include internal computer boards, external instruments, a second computer system, an embedded device, or the like.

The primary software application can be a modeling or simulation application for modeling a system, such as a control system or dynamic system. For example, MATLAB®, provided by The Mathworks, Inc. of Natick, Mass., may serve as the primary software application. MATLAB® is an interactive programming application that can implement a variety of computing tasks in engineering and science. MATLAB® has the ability to execute other executable programs. Some of the tasks that MATLAB® can perform range from data acquisition and analysis to application development. The MATLAB® environment integrates mathematical computing, visualization, and technical programming language. MATLAB® includes built-in interfaces that provide access to and import data from instruments, files, and external databases and programs.

In addition, MATLAB® can integrate external routines written in C, C++, Fortran, and Java with MATLAB® applications. As such, MATLAB® provides an example of an interactive programming environment that can work in conjunction with C routines provided external to MATLAB®, including those provided by third party providers. Users of MATLAB®, and similar programs, often have the need to communicate with other software or hardware components using programs like MATLAB®.

Conventional solutions provide a level of compatibility for software application developers that need to communicate with different hardware components. However, the conventional solutions include several limitations relating to how each hardware component presents itself to the software developer in the form of a programming interface.

More specifically, Interchangeable Virtual Instrument (IVI) drivers, for example, provide a common application programming interface for many instruments, but are limited to those devices which have such a driver. Software component technologies, such as Microsoft's .NET, allow the use of software components, including those that interface with hardware components, that can publish their capabilities to provide a small degree of interface independence. However, such components must conform to a specific mechanism for publishing their capabilities. The existing solutions do not allow for the inclusion of legacy driver formats or component technologies, future technologies, mixed formats and component technologies, and arbitrary interfaces that do not conform to any current standard.

Another class of approaches to achieve compatibility concerns object models. With object models, a component must be written to be compliant with a specified interface. Microsoft Corporation's Component Object Model (COM), and the Object Management Group's Common Object Request Broker Architecture (CORBA), provide such interfaces.

A third example programming interface method is to create a way for the user to define the interfaces present in a shared library that was designed to be called from a standard programming language, such as the C programming language. A special document or library definition custom to the application must be created by the user (or additionally provided) that defines the interface to the library. There is no mechanism for automatically creating the special document, the custom library definition, or any form of library function interface that defines the interface to the library.

In many different computer environments, there is often a need for a software application to be able to call external functions that are not specifically designed for use with the software application. In many programming languages, there are groups of functions that can be called by any number of different software applications. One example programming language is the C programming language.

SUMMARY OF THE INVENTION

There is a need for a common interface for any hardware or software component that provides or includes some mechanism for advertising its features, input, and output requirements. The present invention is directed toward further solutions to address this need.

In accordance with one aspect of the present invention, in an electronic device, a cross-platform interface tool for automatically creating a common programming interface for a plurality of components includes a parsing mechanism for parsing through a component description associated with at least one of the plurality of components to gather information relating to the at least one of the plurality of components. A component interface creator automatically generates a component interface based on the information gathered by the parsing mechanism.

In accordance with aspects of the present invention, the component description includes information relating to component features and interface requirements. The component description further includes an advertising mechanism for advertising the information. The advertising mechanism can be in the form of data and/or a software object definition. The component description can include a communications system.

In accordance with further aspects of the present invention, the component interface creator includes a lookup mechanism for searching existing component interfaces to determine whether a previously established component interface already exists. The component interface creator can further include a class generator for generating a class based on the information gathered by the parsing mechanism if there is no pre-existing component interface. The component interface creator can further include an instantiator for instantiating a class generated by a class generator to create a device object for interfacing with the at least one of the plurality of components if there is no pre-existing component interface.

In accordance with further aspects of the present invention, the component includes a hardware device, a data or image acquisition device, and/or an embedded device. The cross-platform interface tool can further include a testing tool for verifying performance of the component interface.

In accordance with one embodiment of the present invention, in an electronic device, a method of automatically creating a common programming interface for a plurality of components using a cross-platform interface tool includes parsing through a component description associated with at least one of the plurality of components to gather information relating to the at least one of the plurality of components. The method continues with automatically generating a component interface based on the information gathered by the parsing mechanism.

In accordance with aspects of the present invention, the component description includes information relating to component features and interface requirements. The component description can further include an advertising mechanism advertising the information. The advertising mechanism can be data and/or a software object definition. The component description can be a communications system.

In accordance with further aspects of the present invention, the step of automatically generating a component interface includes a lookup mechanism searching existing component interfaces to determine whether a previously established component interface already exists. The step of automatically generating a component interface includes a class generator generating a class based on the information gathered by the parsing mechanism if there is no pre-existing component interface. The step of automatically generating a component interface includes an instantiator instantiating a class generated by a class generator to create a device object for interfacing with the at least one of the plurality of components if there is no pre-existing component interface.

In accordance with further aspects of the present invention, the component is a hardware device, a data or image acquisition device, and/or an embedded device. The performance of the component interface can be verified utilizing a testing tool.

In accordance with one embodiment of the present invention, a medium for use in a modeling and execution environment on an electronic device is provided. The medium holds instructions executable using the electronic device for performing a method of automatically creating a common programming interface for a plurality of component using a cross-platform interface tool. The method includes parsing through a component description associated with at least one of the plurality of components to gather information relating to the at least one of the plurality of components. The method continues with automatically generating a component interface based on the information gathered by the parsing mechanism.

BRIEF DESCRIPTION OF THE DRAWINGS

The present invention will become better understood with reference to the following description and accompanying drawings, wherein.

DETAILED DESCRIPTION

Figure 1:
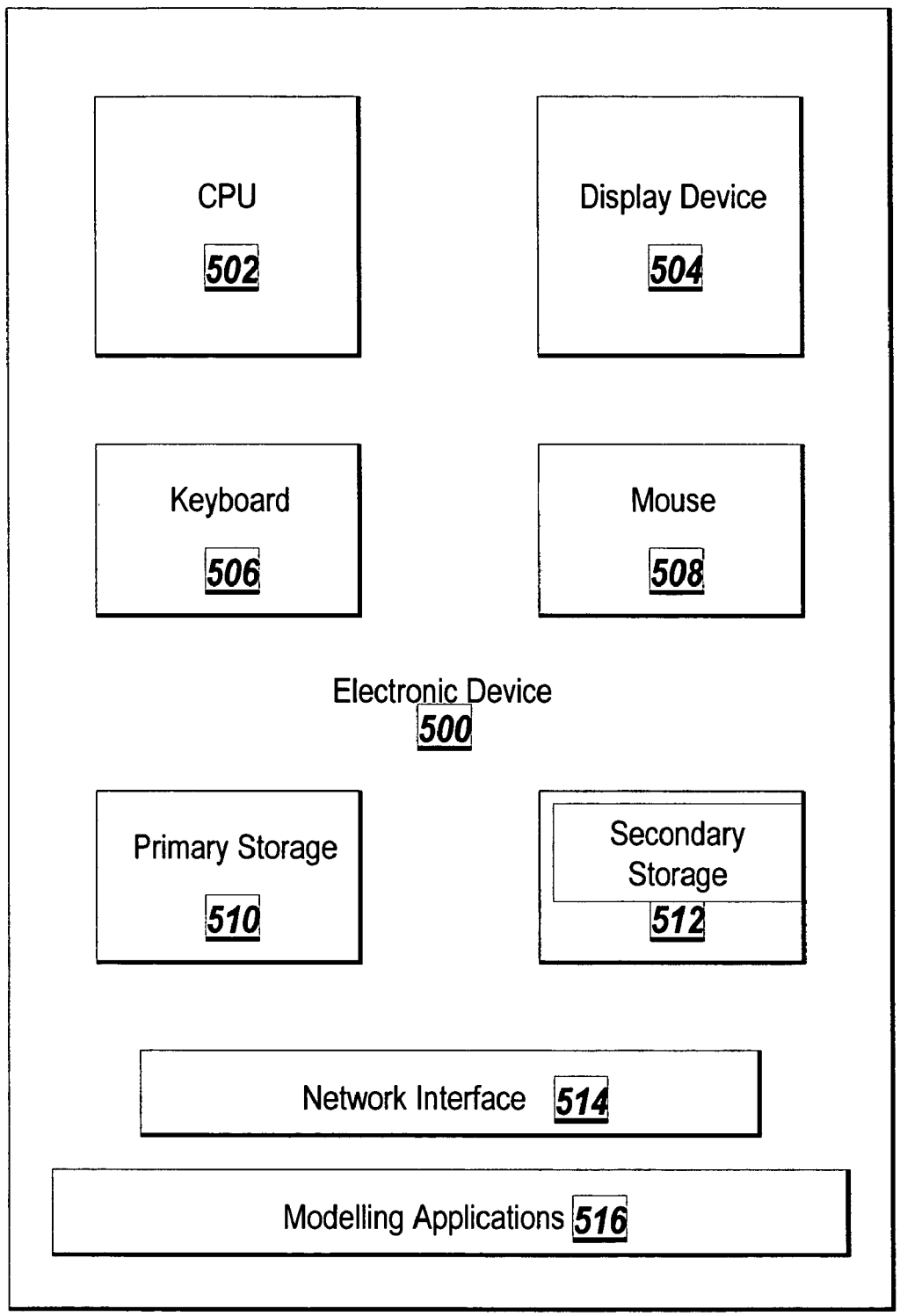
FIG. 1 is a diagrammatic illustration of an electronic device for use in implementing a method in an illustrative embodiment of the present invention.

An illustrative embodiment of the present invention relates to a cross-platform interface tool that provides a common interface for any hardware or software component having some advertising mechanism for listing the input, and output requirements of the component. The advertising mechanism can take a number of different forms, including data, a software object definition, or a communications system.

FIGS. 1 through 13, wherein like parts are designated by like reference numerals throughout, illustrate an example embodiment of a cross-platform interface tool, and method of operation, according to the present invention. Although the present invention will be described with reference to the example embodiment illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

The present invention can be implemented on an electronic device. FIG. 1 illustrates one example embodiment of an electronic device 500 suitable for practicing the illustrative embodiments of the present invention. The electronic device 500 is representative of a number of different technologies, such as personal computers (PCs), laptop computers, workstations, personal digital assistants (PDAs), Internet appliances, cellular telephones, wireless devices, and the like. In the illustrated embodiment, the electronic device 500 includes a central processing unit (CPU) 502 and a display device 504. The display device 504 enables the electronic device 500 to communicate directly with a user through a visual display. The electronic device 500 further includes a keyboard 506 and a mouse 508. Other potential input devices not depicted include a stylus, trackball, joystick, touch pad, touch screen, and the like. The electronic device 500 includes primary storage device 510 and secondary storage device 512 for storing data and instructions. The primary and secondary storage devices 510 and 512 can include, but are not limited to, such technologies as a floppy drive, hard drive, tape drive, optical drive, read only memory (ROM), random access memory (RAM), and the like. Applications such as browsers, JAVA virtual machines, C compilers, and other utilities and applications can be resident on one or both of the primary and secondary storage devices 510 and 512. The electronic device 500 can also include a network interface 514 for communicating with one or more electronic devices external to the electronic device 500 depicted. Modems and Ethernet cards, are examples of network interfaces 514 for establishing a connection with an external electronic device or network. The CPU 502 has either internally, or externally, attached thereto one or more of the aforementioned components. In addition to applications previously mentioned, modeling applications 516, such as MATLAB®, or Simulink®, can be installed and operated on the electronic device 500.

It should be noted that the electronic device 500 is merely representative of a structure for implementing the present invention. However, one of ordinary skill in the art will appreciate that the present invention is not limited to implementation on only the described electronic device 500. Other implementations can be utilized, including an implementation based partially or entirely in embedded code, where no user inputs or display devices are necessary. In such an instance, a processor can communicate directly with another processor, or other device.

It should further be noted that the following description makes use of MATLAB® as a representative modeling application that can make use of the present invention. However, the present invention is by no means limited to use with MATLAB®, or even interactive programming applications. The present invention, and its equivalents as understood by those of ordinary skill in the art, can be utilized in conjunction with interactive applications, compilers, and other code-generating mechanisms.

Figure 2:
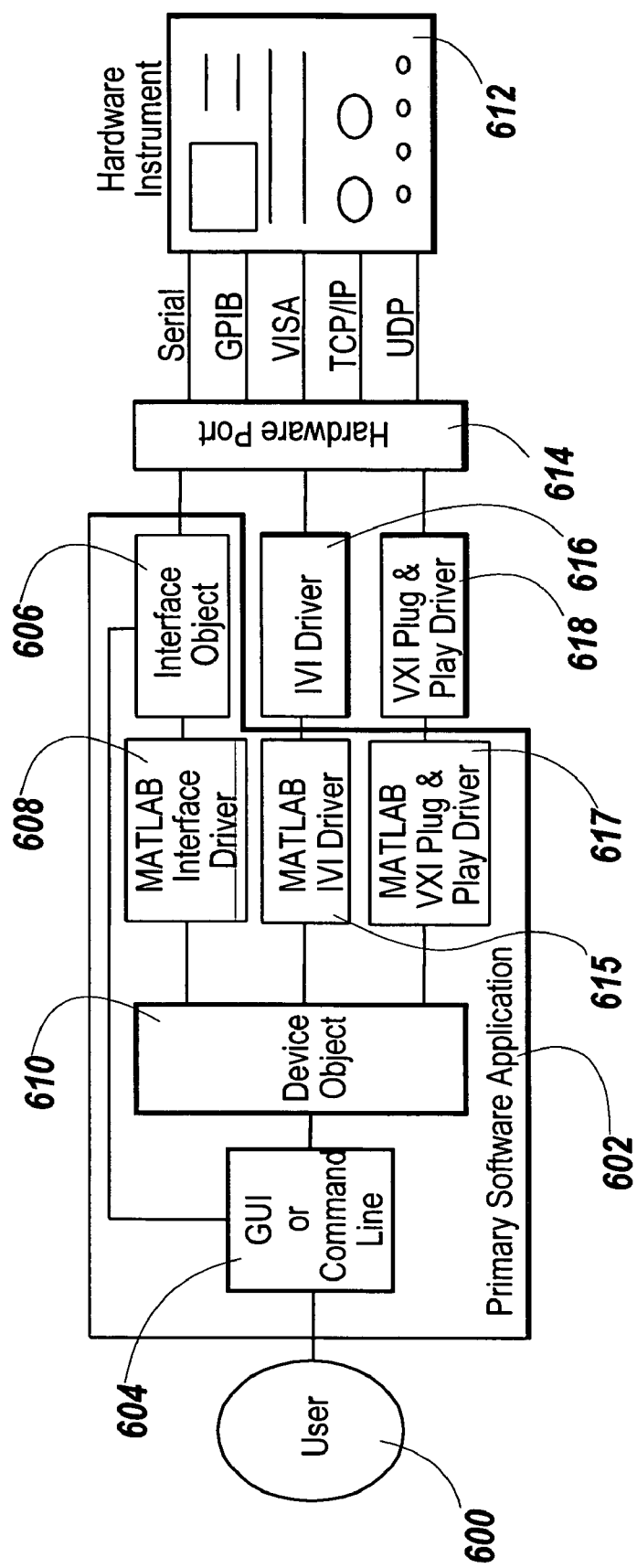
FIG. 2 is a diagrammatic illustration of a cross-platform interface scenario, according to one aspect of the present invention.

FIG. 2 is a diagrammatic illustration of an example situation in which the cross-platform interface tool of the present invention can be utilized. In the example situation, a user 600 is using a primary software application 602, in the form of the modeling application MATLAB®, which was previously discussed. The primary software application 602, in the example instance, includes a GUI or command line 604, an interface object 606, a MATLAB® interface driver 608, and a device object 610. In addition, the primary software application 602 includes a MATLAB® IVI driver 615 and a MATLAB® VXI plug & play driver 617, which exist in memory or on disk, and are created based on an IVI driver 616 and a VXI plug & play driver 618. The user 600 desires the ability to interface with a hardware instrument 612 through a hardware port 614. In the example shown, the hardware instrument 612 requires the user 600 to make use of three different drivers to control all aspects of the hardware instrument 612, the IVI driver 616, the VXI plug & play driver 618, and the MATLAB® interface driver 608.

In order for the user 600 to communicate with the hardware instrument 612 to execute such operations as setting parameters, operating the hardware instrument 612, and reviewing and recording results relating to operation of the hardware instrument 612, the user must be able to interface with the hardware instrument 612 using one or more of the IVI driver 616, the VXI plug & play driver 618, and the MATLAB® interface driver 608. The specific operation performed by each of the drivers 608, 616, and 618 is not relevant to the issue of being able to operate each of the drivers 608, 616, and 618 from a single software application, such as the primary software application 602. Regardless of the operations performed by each of the drivers 608, 616, and 618, the user 600 still requires the ability to interface with and operate each of the drivers 608, 616, and 618, to operate the hardware instrument 612. It should be noted that the specific types of drivers, e.g., IVI, VXI PLUG & PLAY, and MATLAB®, are also not specifically required for use with the present invention. As long as the drivers 608, 616, and 618 have some form of advertising mechanism that indicates the features, inputs, and outputs of the drivers 608, 616, and 618, the present invention can be utilized to enable full operation and control of the hardware instrument 612. It should further be noted that instead of the hardware instrument 612, the primary software application 602 can alternatively require interaction with a data or image acquisition device, embedded device, or other hardware component. Thus, the term "hardware instrument 612" as utilized herein is intended to be representative of a number of different devices and components with which a user may require interaction using one or more different compatible or non-compatible drivers.

An example format for the advertising mechanism is an XML file containing data. One of ordinary skill in the art will appreciate that the advertising mechanism can have a number of different formats, including any form of markup language, or other data conveying format. In addition, the user or some other source can provide information equivalent to that found in the advertising mechanism, such that an advertising mechanism is not required. When the advertising is in the form of an XML file, the XML file can contain a number of different types of information. An example XML file for a method definition in a MATLAB® interface driver is provided below for illustrative purposes:

```
<Method>
   <Name>measure</Name>
   <Location>parent</Location>
   <CapabilityGroup>Measurement</CapabilityGroup>
   <Type>InstrumentCommand</Type>
   <Code>
   <Commands>
      <Line    Command="Data:Start    <start>"
          Output="false"/>
      <Input>start</Input>
   <Commands>
   </Code>
   <Description>Initiate and return measured values. </Description>
</Method>

<Method>
   <Name>measure2</Name>
   <Location>parent</Location>
   <CapabilityGroup>Measurement</CapabilityGroup>
```

```
<Type>MCode</Type>
<Code>
<MCode>
    function out=measure(obj, value)<
/MCode>
</Code>
<Description>Initiate and return measured values.</Description>
```
</Method>

One of ordinary skill in the art will appreciate that the above example is provided merely for illustrative purposes as one potential format and approach serving as an advertising mechanism.

The rules associated with the above XML format for the MATLAB® interface driver are as follows. The Name field is the name of the method. The Location field is the type of object on which the method operates. If location is parent, the method operates on device objects. The CapabilityGroup field is an unused feature but provides a way to categorize the method. The Type field can be either InstrumentCommand or MCode. The Code field varies based on the Type field. If Type is InstrumentCommand, the Code field contains a Commands field that can contain any number of line fields. The line field can define the following attributes, Command—the command written to the instrument, Output—true if the Command being written will return data, ReadOutputAs—defines if the data read from the instrument is read as ASCII, binary or binblock data, and Format—the format of the data being read. The Command attribute can contain angle brackets around a portion of the command. This portion of the command is replaced with the input argument defined. The Input fields define the input arguments to the method. These are the variable names that are used in the Command attribute of the Code field. If Type is MCode, the Code field contains a MCode field that contains the M-Code that is executed when the method is executed. The Description field defines the on-line help that is returned by the instrhelp toolbox function.

Other XML files, or other markup language or files of other formats are provided in association with the driver or drivers of a particular component. Such other files contain additional information advertising the inputs, outputs, and any other requirements of the particular driver being advertised.

As can be seen in the example of FIG. 2, MATLAB® serves as the primary software application 602. MATLAB® includes some MATLAB® interface drivers 608 that come standard with the application, or are easily obtainable for use with the application, or can be created by the user with the driver creation tool. The IVI driver 616 and the VXI plug & play driver 618 represent two different additional third party drivers that are not necessarily designed for use with, or to be operated by, the primary software application 602 (in this case, MATLAB®). As such, in order for the user 600 to be able to operate the hardware instrument 612, an interface in the form of the device object 610 must be created to interface with the different drivers 608, 616, and 618.

Accordingly, the present invention provides a cross-platform interface tool 900 (see FIG. 3), which automatically collects information from each of the drivers 608, 616, and 618, and creates the device object 610 interface for interfacing with the hardware instrument 612 utilizing the primary software application 602, without requiring the user 600 to have specific knowledge concerning the characteristics or requirements of the drivers 608, 616, and 618.

Figure 3:
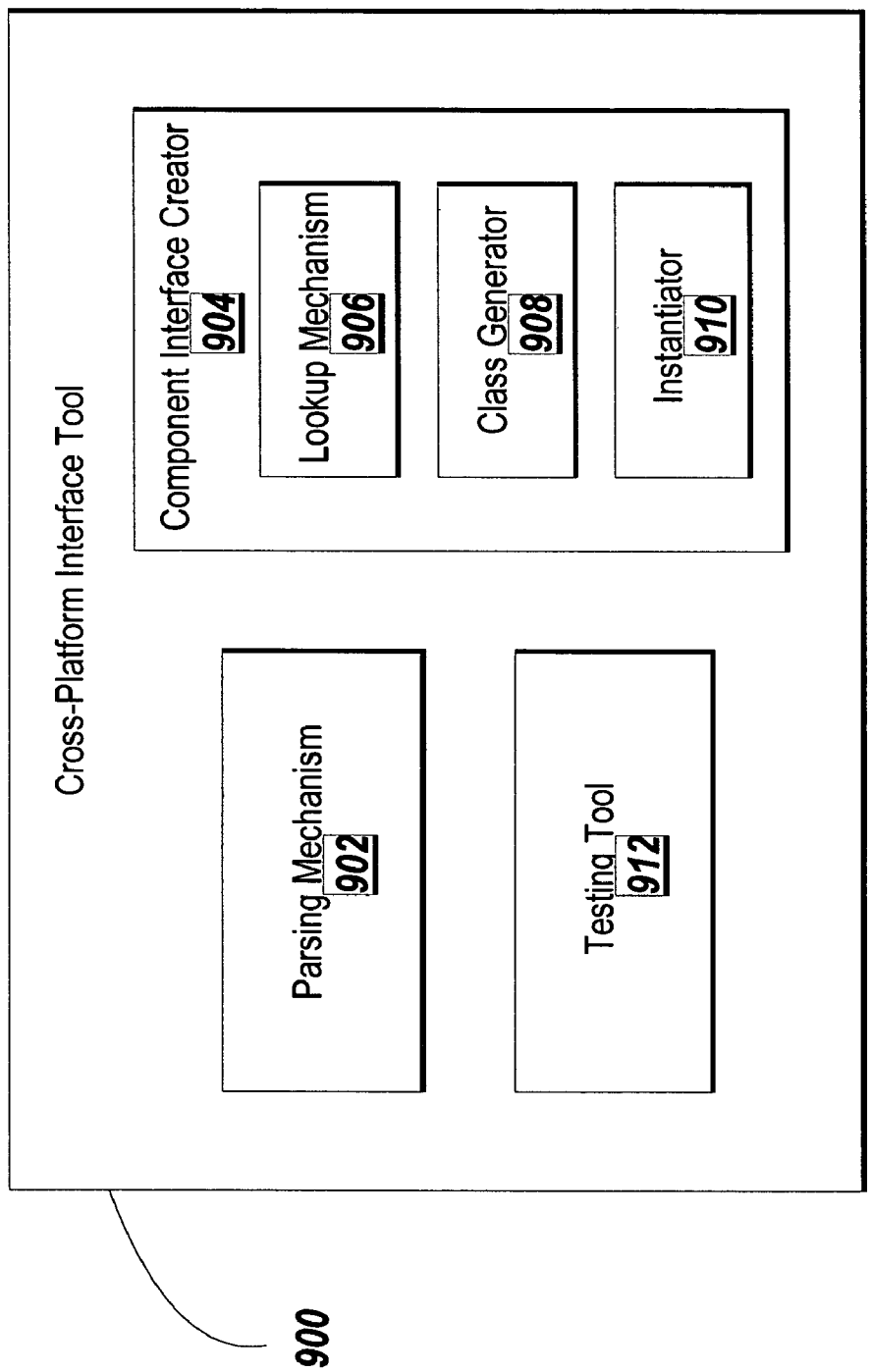
FIG. 3 is a diagrammatic illustration of the cross-platform interface tool, according to one aspect of the present invention

Prior to discussing the operation of the cross-platform interface tool 900 of the present invention, FIG. 3 is provided to diagrammatically illustrate the cross-platform interface tool 900 in accordance with one example embodiment of the present invention. It should be noted that the example embodiment illustrated in the present description relates to the implementation of the present invention using a Java based language. One of ordinary skill in the art will appreciate that equivalent actions can be implemented using other languages, such as C, C++, Component Object Model (COM), and the like. Should such other languages be utilized, one of ordinary skill will appreciate that the specific programming structures will be modified in accordance with the programming requirements of the specific language utilized. As such, the present invention is not limited by the structural requirements of the Java-based implementation.

In short, the cross-platform interface tool 900 automatically creates a common programming interface for a plurality of components having drivers of potentially different compatibilities. A parsing mechanism 902 is provided as a function of the cross-platform interface tool 900. The parsing mechanism 902 parses through a component description associated with one or more of the plurality of components to gather information relating components. A component interface creator 904 is also provided as a portion of the cross-platform interface tool 900. The component interface creator 904 automatically generates a component interface based on the information gathered by the parsing mechanism 902.

The component interface creator 904, in accordance with one example embodiment, is formed of three functional elements. A lookup mechanism 906 searches existing component interfaces to determine whether a previously established component interface already exists. A class generator 908 generates a class based on the information gathered by the parsing mechanism 902 if there is no pre-existing component interface. An instantiator 910 instantiates a class generated by the class generator 908 to create the device object 610 for interfacing with the at least one of the plurality of components if there is no pre-existing component interface. The cross-platform interface tool 900 can further include a testing tool 912 as later described further herein.

Figure 4:
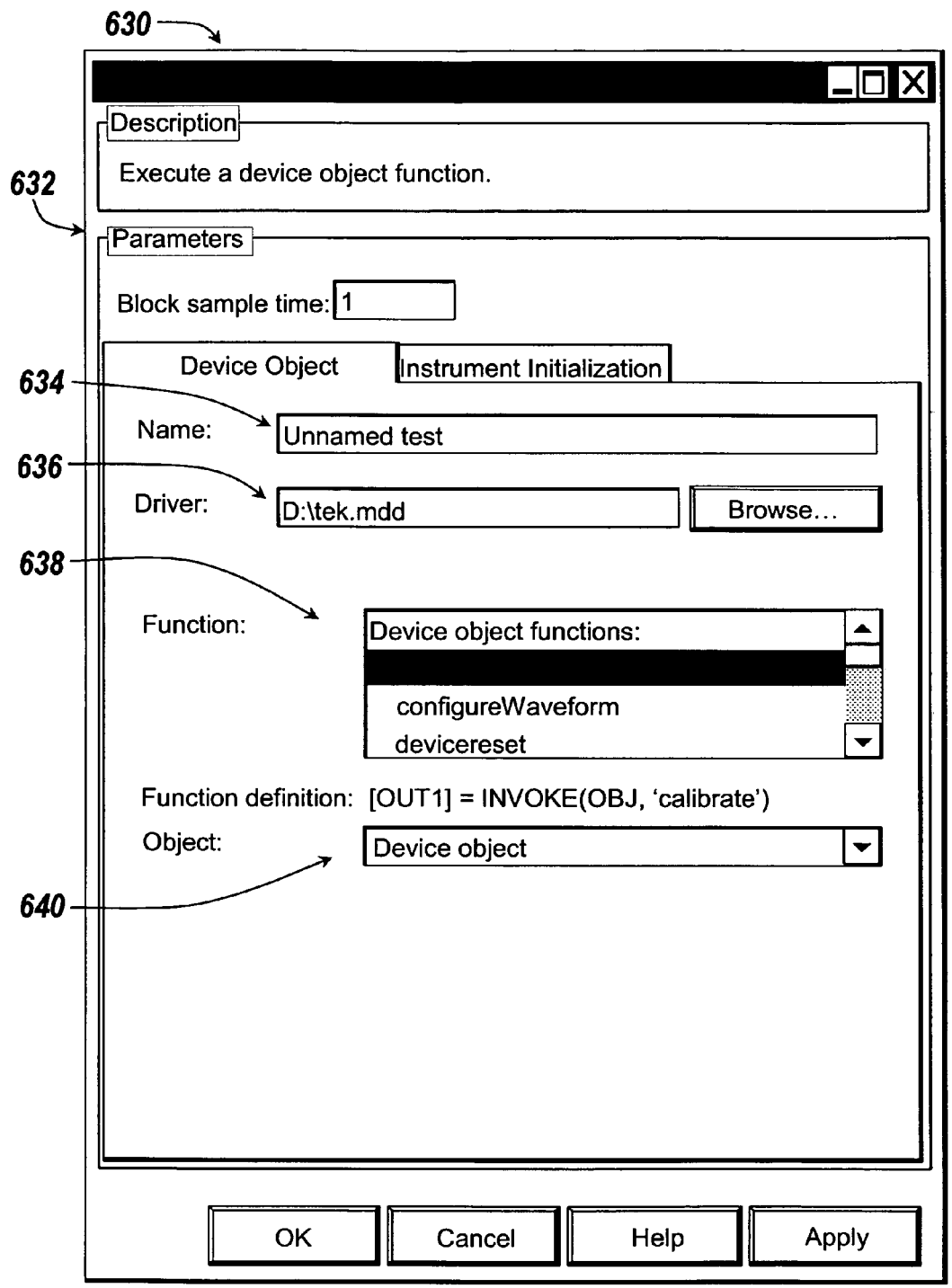
FIG. 4 is a screen depiction of a cross-platform interface tool GUI, according to one aspect of the present invention.

FIG. 4 is a representative screen depiction of a cross-platform interface tool GUI 630. One of ordinary skill in the art will appreciate that the cross-platform interface tool GUI 630 can take a number of different forms, or have a number of different formats, thus the present invention is not limited to the specific illustrative example shown in the figure.

The cross-platform interface tool GUI 630 provides an interface for the user to initiate a device object communicating with a hardware instrument. The cross-platform interface tool GUI 630 includes a parameter block 632 for a user to enter parameter values for the hardware instrument 612. A name field 634 indicates the name of the particular hardware instrument 612 that is being referenced. A driver field 636 indicates the location of the particular driver that the user is implementing to operate or communicate with the hardware instrument 612. A function list field 638 provides the user with a list of different functions or operations available to the user. An object field 640 indicates the device object for interfacing with the hardware instrument 612.

Figure 5:
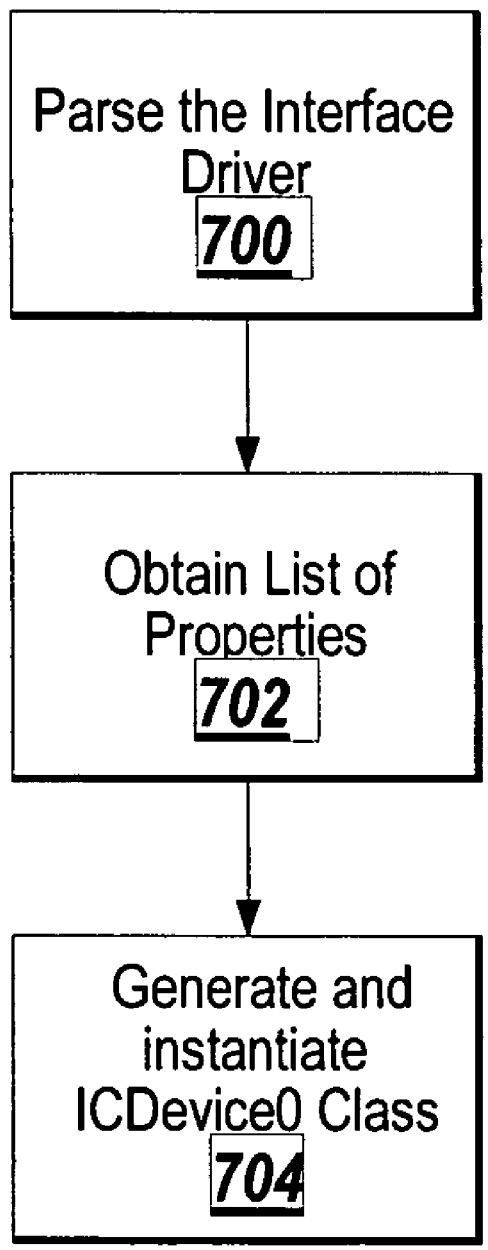
FIG. 5 is a flowchart illustrating an example process for generating a device object, according to one aspect of the present invention.

FIG. 5 is a flowchart showing one example process for generating a device object from a MATLAB® interface driver. This process is automatically executed when a user attempts to access the primary software application 602 interface driver 608, which is a MATLAB® interface driver in the examples provided herein. It should be noted that the driver in the examples provided herein does not limit the invention to use with drivers. The device object can be generated based on, for example a configuration file or other source that can be parsed.

To continue with the example illustrative embodiment of the present invention, the MATLAB interface driver is parsed (step 700). A list of properties defined by the driver is obtained (step 702). A class called ICDevice0 is defined and an instance of that class is created (step 704). One of ordinary skill in the art will appreciate that the name of the class can vary in accordance with a programmer's preferences. The name of the class provides the ability to increment, for example, subsequent objects created will have increasing numerical values in the form of ICDevice1, ICDevice2, ICDevice3, and the like. In the example implementation, the ICDevice0 class contains, among other items, two methods for each property in the MATLAB® interface driver 608, namely setPropertyName and getPropertyName methods.

A new object is instantiated for each MATLAB interface driver if one has not already been created. If the MATLAB® interface driver 608 should change, a new object is also instantiated. The ICDevice0 class extends a pre-existing ICDevice class. In other words, ICDevice0 inherits from ICDevice. ICDevice further extends a pre-existing Device class. The Device class contains "set" and "get" methods for those properties that are common to all device objects. The Device class also contains the methods that are common to all device objects, e.g. selftest.

There are a number of different functions offered with the ICDevice0 class. Two methods that were previously mentioned as being included in the ICDevice0 class are setPropertyName and getPropertyName methods. Again, as understood by one of ordinary skill in the art, the names of the methods, classes, and objects, are all programmer preference. There is no requirement that the specific names utilized in the example implementation be utilized in the implementation of the present invention.

The setPropertyName and getPropertyName methods each call "set" and "get" methods, respectively, in the ICDevice class. An example implementation of the setPropertyName method is as follows:

public void setContrast(double value){
set('Contrast', value);
}

An example implementation of the getPropertyName method is as follows:

public double getContrast( ){
return get('Contrast');
}

The ICDevice class, from which the ICDevice0 class inherits some functionality, includes its own additional functions. For example, a "set" method and a "get" method look up in the MATLAB® interface driver 608 what needs to be done when a particular property is "set" and "get".

It should be noted that the object-oriented device object interface can automatically be generated from a procedural shared library (VXI plug-n-play, IVI-C, and similar drivers) as would be understood by one of ordinary skill in the art. Many drivers only provide standard function calls through software modules such as shared libraries. These libraries do not incorporate the objects, or objects that have properties and methods. The present invention can scan the function lists for these types of drivers and automatically interpret functions or function pairs that represent properties when generating the objects. As such, the present invention is not limited to the specific embodiments illustrated, but can be utilized in conjunction with other sources of driver information.

Figure 6:
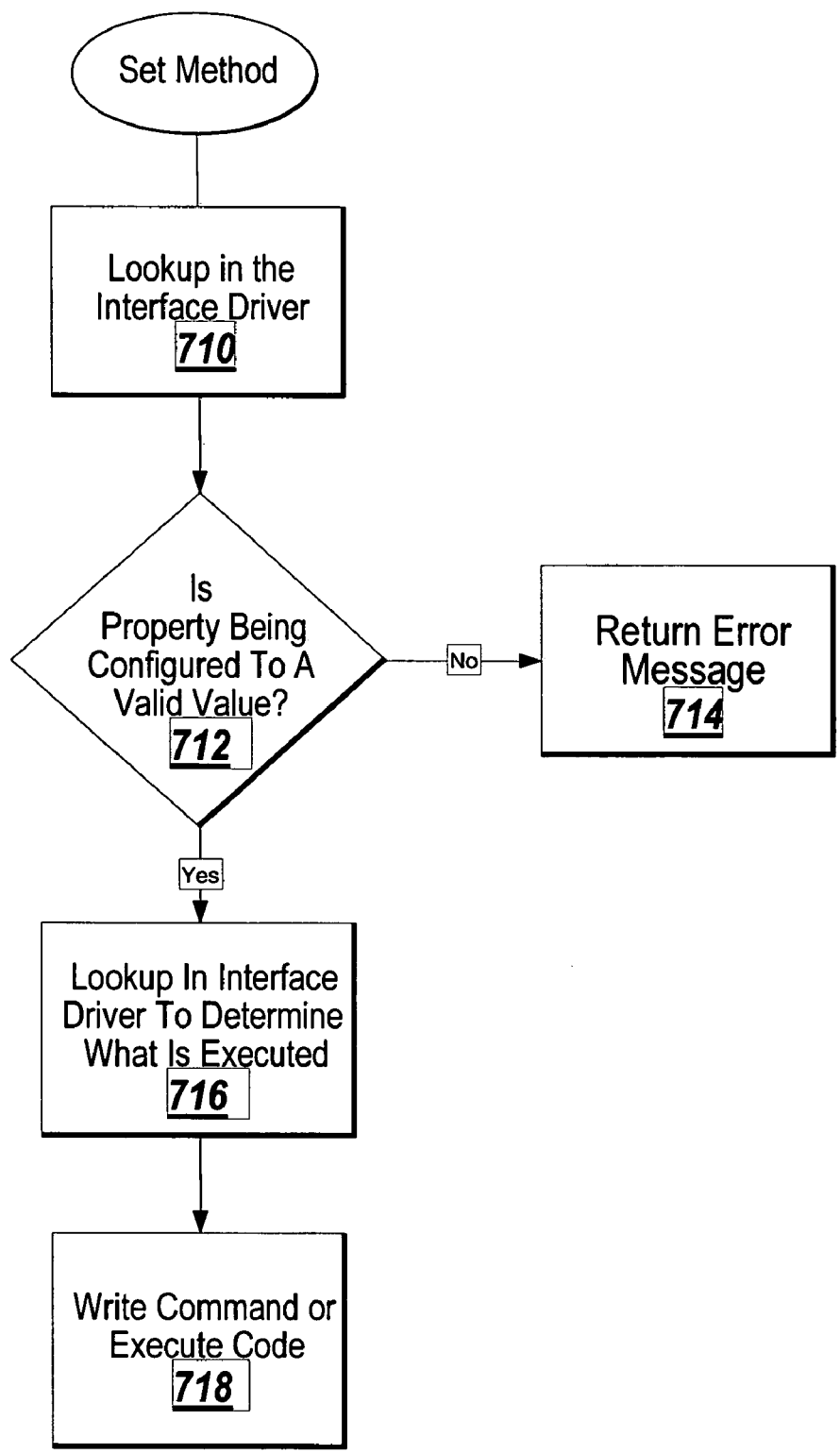
FIG. 6 is a flowchart illustrating an example operation occurring when a property is "set", according to one aspect of the present invention.

FIG. 6 is a flowchart that illustrates example operations that occur when a property is "set". First a lookup in the MATLAB® interface driver seeks to learn what values are available for configuration of the particular property (step 710). A verification step verifies that the property is being configured to a valid value (step 712). If the property is being configured to a value that is unavailable or invalid, an error is returned indicating the valid values (step 714). A lookup in the MATLAB® interface driver 608 executes to determine what instrument command or MATLAB® code is executed when the property is configured (step 716). The device object writes the instrument command to the hardware instrument 612, or executes MATLAB® code (step 718).

Figure 7:
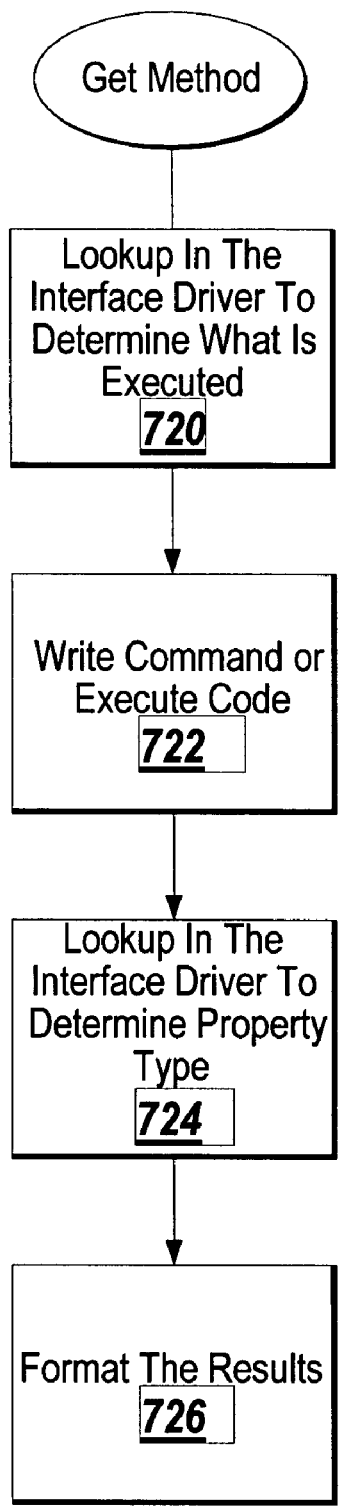
FIG. 7 is a flowchart illustrating an example operation occurring when a property is "get", according to one aspect of the present invention.

FIG. 7 is a flowchart that illustrates example operations that occur when a "get" of a property is performed. First a lookup in the MATLAB® interface driver determines what command or MATLAB® code executes when the property is configured (step 720). The device object writes the instrument command to the hardware instrument 612, or executes the corresponding MATLAB® code (step 722). Another lookup in the MATLAB® interface driver determines the type of the property, e.g. double, string, and the like (step 724). The results are then formatted from the instrument into the type that property supports (726).

Figure 8:
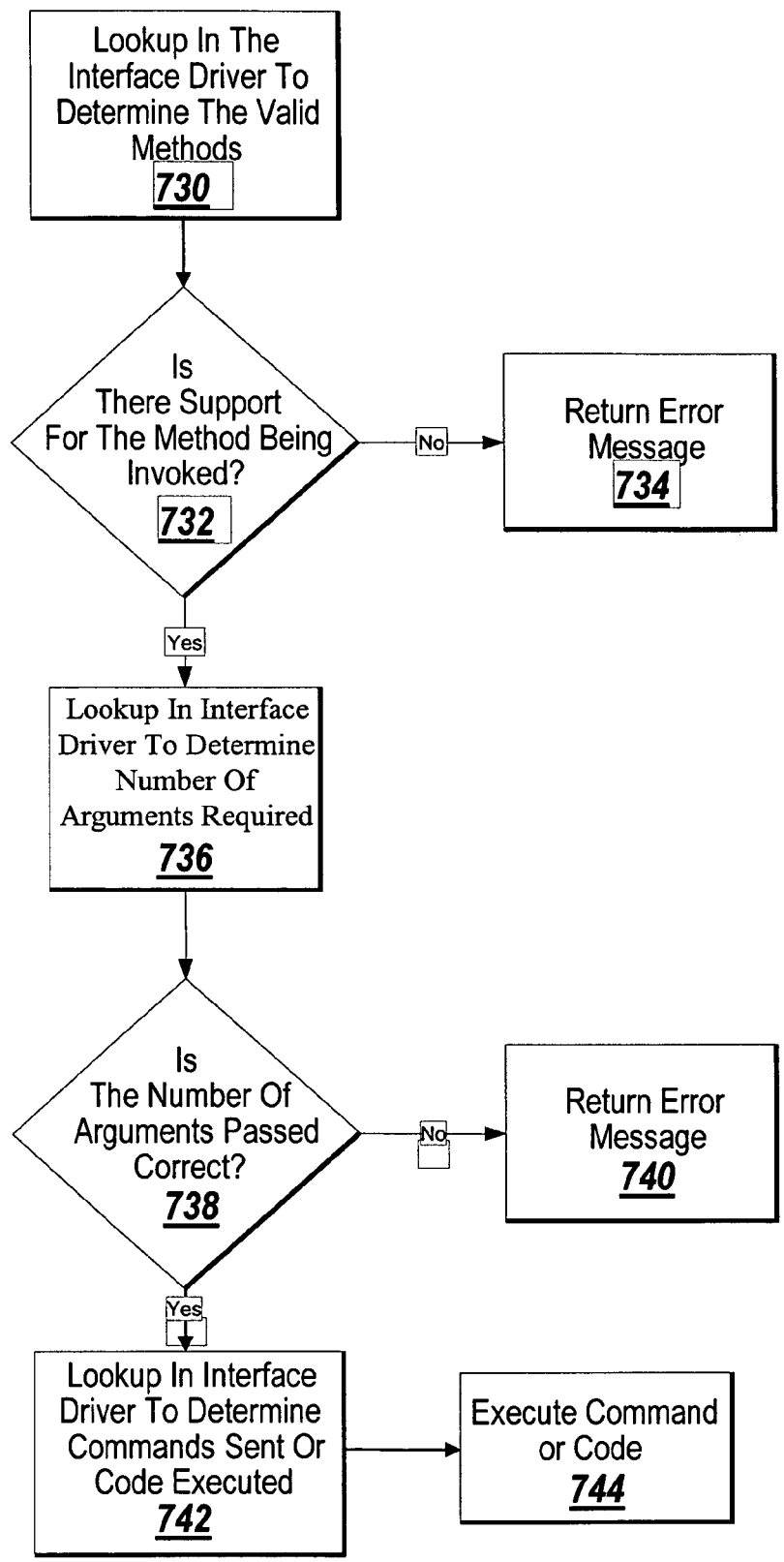
FIG. 8 is a flowchart illustrating an execution of a method on a device object, according to one aspect of the present invention.

In addition to the above-noted operations, the ICDevice class also contains functions to handle the methods defined in the MATLAB® interface driver 608. When a user executes a method on a device object, an invoke method in ICDevice is executed. The invoke method carries out the following steps, as illustrated in FIG. 8. First, a lookup is performed in the MATLAB® interface driver 608 for the list of methods supported by the driver (step 730). A verification step verifies that the method being invoked is supported by the driver (step 732). If the method being invoked is not supported by the driver, an error message results (step 734). A lookup is performed in the MATLAB® interface driver 608 for the number of input arguments that the method requires (step 736). A verification step verifies the number of arguments passed to the method (step 738). If the number of arguments is invalid, an error message results (step 740). A lookup is performed in the MATLAB® interface driver 608 for the instrument commands that are sent to the hardware instrument 612, or the MATLAB® code that is executed when the method is invoked (step 742). The command is then executed (step 744).

Figure 9:
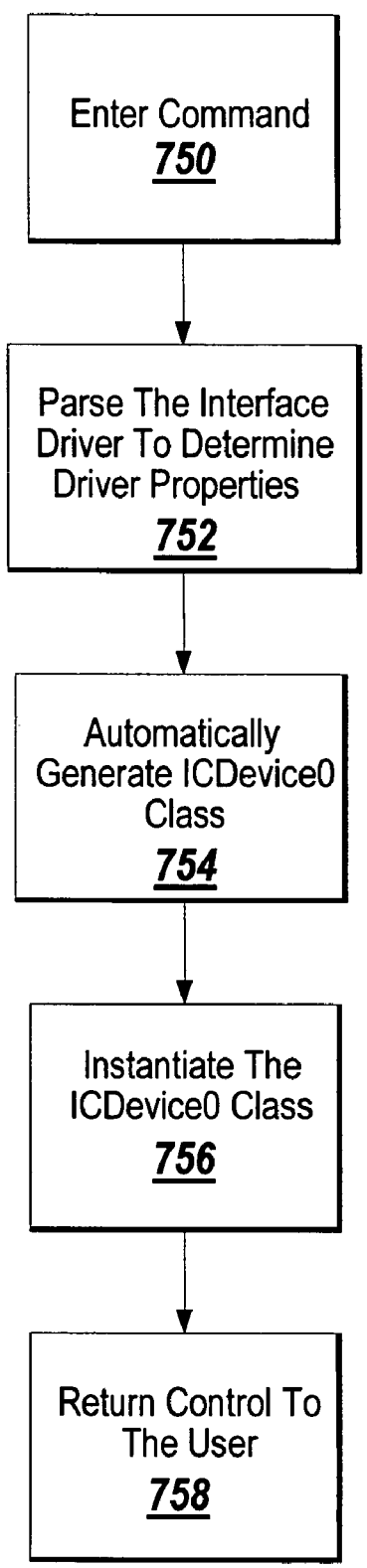
FIG. 9 is a flowchart illustrating the creation of a device object from the user's perspective, according to one aspect of the present invention.

FIG. 9 is a flowchart depicting the creation of a device object from the perspective of the user operating the cross-platform interface tool, using for example, the cross-platform interface tool GUI 630. It should be noted that this is viewed from the perspective of the user, but the actual processes are transparent to the user, as is the case with the description of steps in FIGS. 9, 10, 11, and 12.

The user creates a device object by entering a command (step 750) such as:

>>d=icdevice('MATLAB interface driver name', interface_object);

The MATLAB® interface driver 608 is parsed for properties of the MATLAB® interface driver 608 (step 752). The ICDevice0 class is automatically generated (step 754). It should be noted that the ICDevice0 class is only maintained in memory, a separate file for the class is not generated by this action. The ICDevice0 class is instantiated (step 756). The ICDevice0 class is contained within the MATLAB® device object, d. Control is returned to the user (step 758) for the user to operate the desired hardware instrument 612, or other software application or code.

If the user interacts with the device object, d, at a MATLAB® command prompt, and a java method (or other programming method depending on the language utilized) needs to be called, the ICDevice0 class is extracted and methods contained by ICDevice0 or any of the classes it extends from (ICDevice or Device) can be called.

Figure 10:
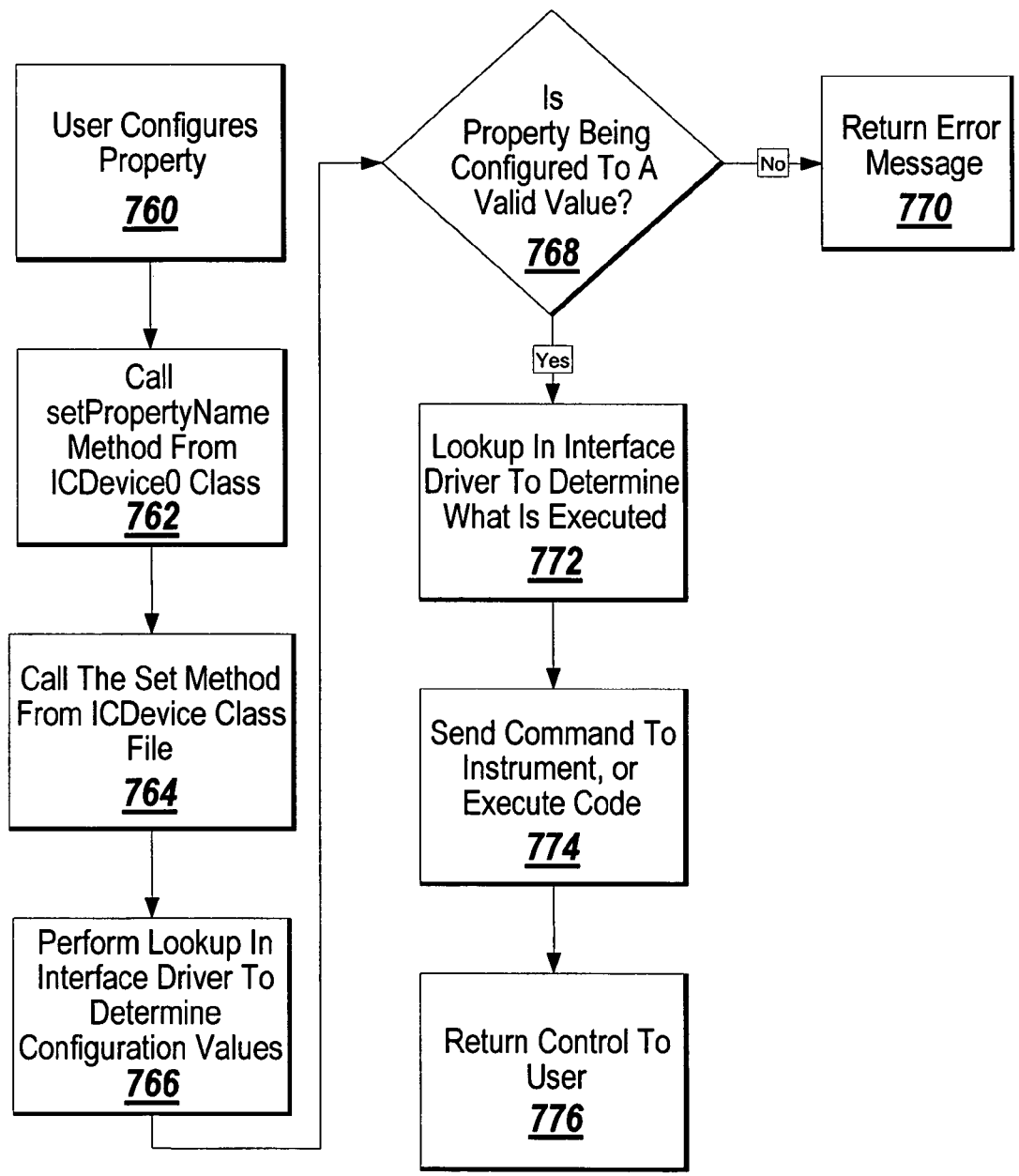
FIG. 10 is a flowchart illustrating the process of setting a property value as viewed from the user's perspective, according to one aspect of the present invention.

FIG. 10 is a flowchart illustrating the process of setting a property value as viewed from the user's perspective. The user configures a property on the device object by entering a command (step 760), such as the following:

>>set(obj, 'PropertyName', PropertyValue)

A "set" M-File calls the setPropertyName method from the ICDevice0 class (step 762). The setPropertyName method of the ICDevice0 class calls the "set" method from the ICDevice class file (step 764) as follows:

set('PropertyName', PropertyValue)

A method defined in the ICDevice class performs a lookup in the MATLAB® interface driver 608 to determine what configuration values are available for the particular property (step 766). A method defined in the ICDevice class verifies that the property is being configured to a valid value (step 768), and if the value is invalid or unavailable, an error message is returned indicating the potential valid values (step 770). A method defined in the ICDevice class performs a lookup in the MATLAB® interface driver 608 to determine what instrument command or MATLAB code is executed when the property is configured (step 772). The instrument command is sent to the hardware instrument 612, or the MATLAB (or other) code is executed (step 774). Control is then returned to the user (step 776).

Figure 11:
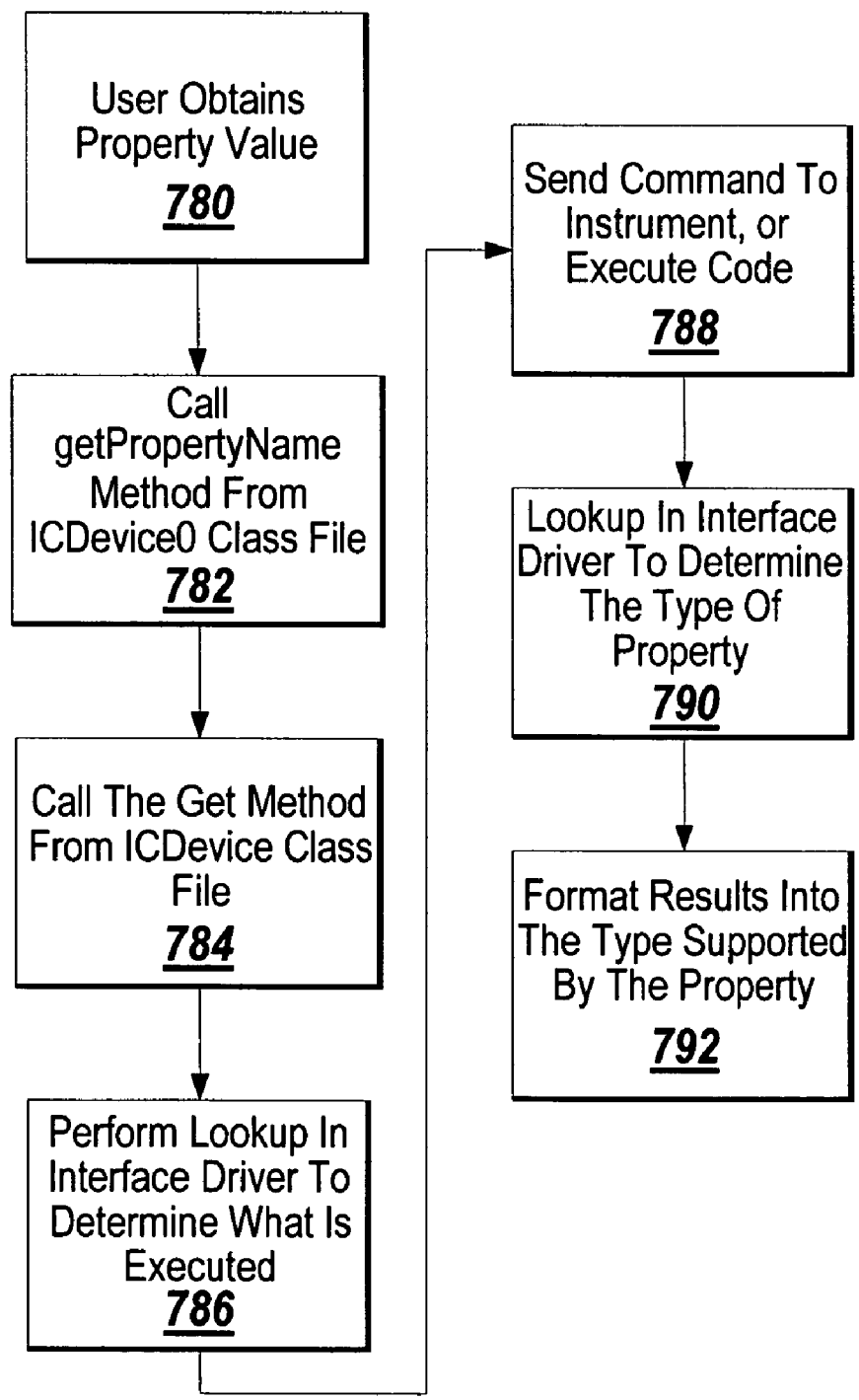
FIG. 11 is a flowchart illustrating the process of getting a property value as viewed from the user's perspective, according to one aspect of the present invention.

FIG. 11 is a flowchart illustrating the process of getting a property value as viewed from the user's perspective. The user gets a property value on the device object by entering a command (step 780), such as the following:

get(obj, 'PropertyName')

A "get" M-File calls the getPropertyName method from the ICDevice0 class (step 782). The getPropertyName method of the ICDevice0 class calls the "get" method from the ICDevice class file (step 784) as follows:

get('PropertyName');

A method defined in the ICDevice class performs a lookup in the MATLAB® interface driver 608 to determine what command or MATLAB® code is executed when the property is configured (step 786). A method defined in the ICDevice class sends the instrument command to the hardware instrument 612, or executes the MATLAB (or other) code (step 788). A method defined in the ICDevice class performs a lookup in the MATLAB® interface driver 608 to determine the type of the property, e.g. double, string, and the like (step 790). A method defined in the ICDevice class formats the results from the instrument into the type that the property supports (step 792).

Figure 12:
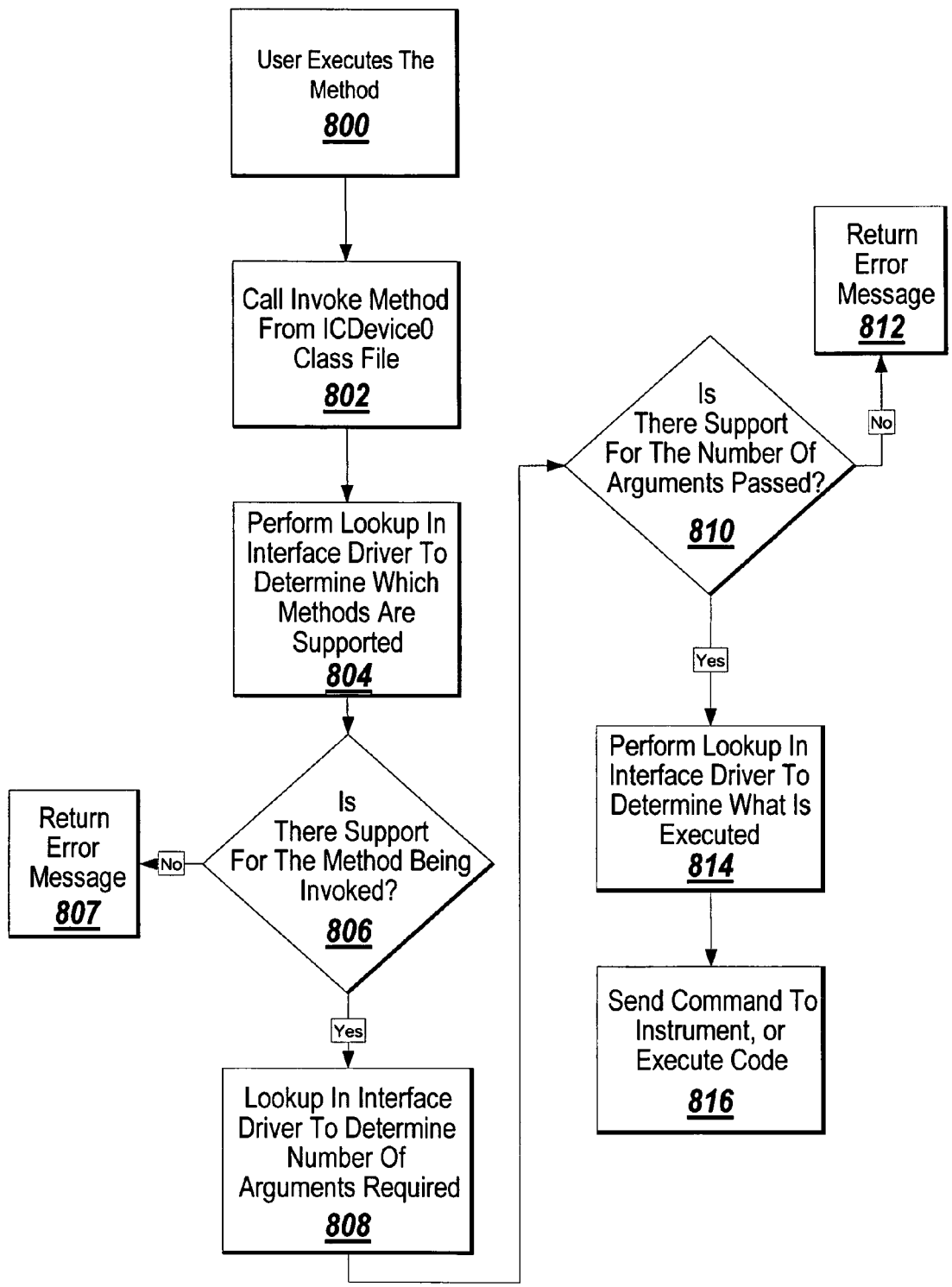
FIG. 12 is a flowchart illustrating the execution of a method as viewed from the user's perspective, according to one aspect of the present invention.

FIG. 12 is a flowchart depicting the execution of a method from the perspective of the user. The user executes the method on the device object by entering a command (step 800) such as the following:

invoke(obj, 'methodname', arg1, arg2, . . . )

An invoke M-File calls the invoke method from the ICDevice class file (step 802). The invoke method of the ICDevice class file performs a lookup in the MATLAB® interface driver 608 to determine which methods are supported by the MATLAB® interface driver 608 (step 804). The ICDevice invoke method verifies that the method being invoked is supported by the driver (step 806). If the method being invoked is invalid or otherwise not supported, an error message results (step 807) and control returns to the user.

The ICDevice invoke method then performs a lookup in the MATLAB® interface driver 608 to determine the number of input arguments that the method requires (step 808). The ICDevice invoke method verifies the number of arguments passed to the method (step 810). If the number of arguments is invalid, an error results (step 812) and control returns to the user.

The ICDevice invoke method then performs a lookup in the MATLAB® interface driver 608 to determine the instrument commands that are sent to the hardware instrument 612, or the MATLAB® code that is executed when the method is invoked (step 814). Execution occurs by implementing the commands or the MATLAB® (or other) code (step 816), and control returns to the user.

The above series of operations and flowcharts describe various interactions resulting from the user implementing the cross-platform interface tool of the present invention. As is illustrated in FIG. 2, other drivers not originating with MATLAB® can also be implemented using the cross-platform interface tool of the present invention. Their implementation occurs in a substantially similar manner to the above description for the MATLAB® drivers, as understood by one of ordinary skill in the art. Because there are any number of different drivers that could potentially operate in conjunction with the cross-platform interface tool of the present invention, and because their operation is substantially the same as the above description, such other driver implementations will not be specifically detailed herein. However, the present invention is by no means limited to use only with MATLAB® drivers. Rather, the methods and operations described herein are applicable for cross-platform implementation with any drivers having the ability to advertise their properties, inputs, and outputs, in a manner that can be perceived by the parsing mechanism described herein.

Figure 13:
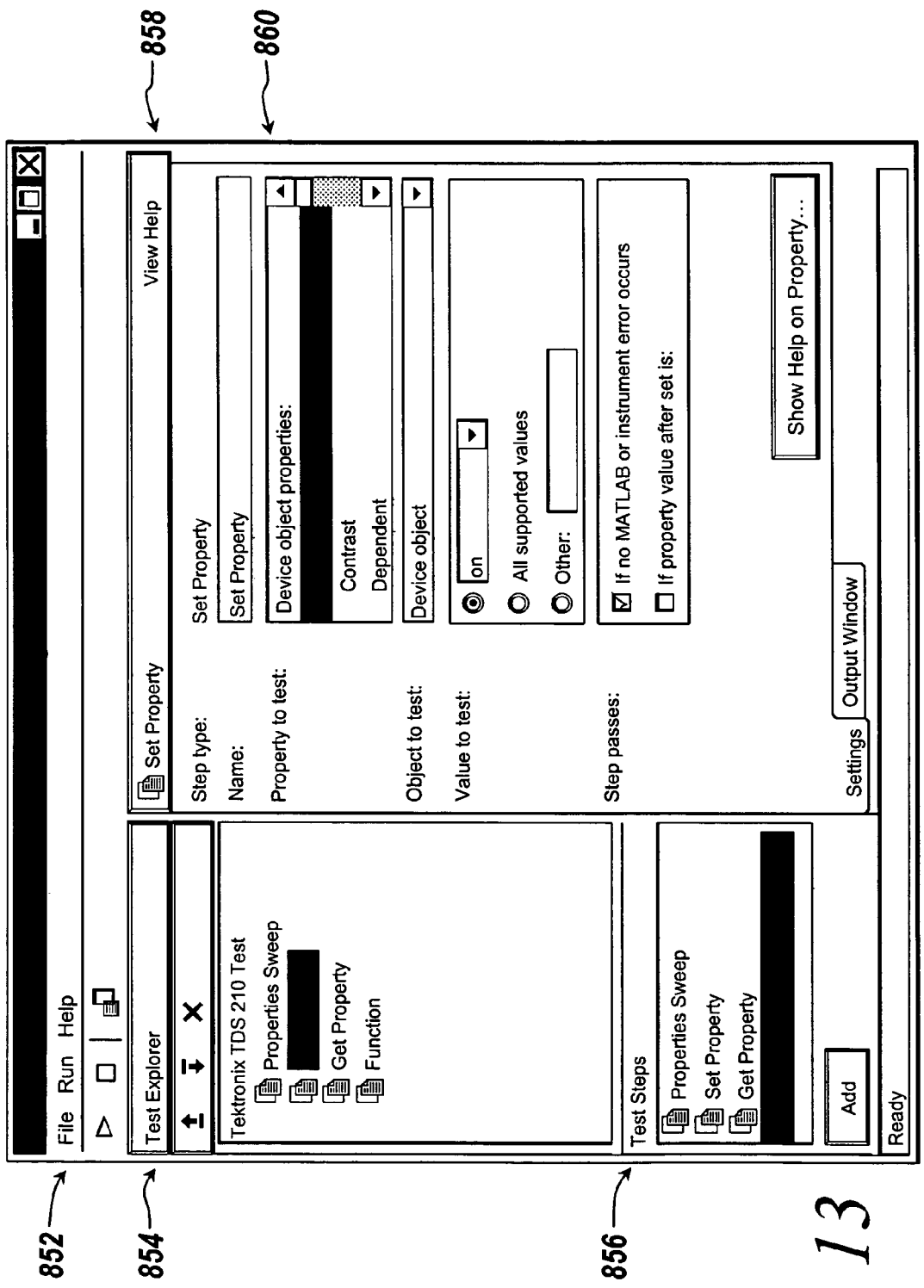
FIG. 13 is a screen depiction of a testing tool GUI, according to one aspect of the present invention.

The cross-platform interface tool of the present invention can further include the testing tool 912 (see FIG. 3) to test various aspects of the device objects created. FIG. 13 is a screen depiction of a testing tool GUI 852. The testing tool 912 can test interface driver properties and the values to which they can be configured and interface driver functions. The testing tool 912 can run through a series of test steps, or run a single test step. The test can be saved to an xml file (or to an M-file to be executed in MATLAB at a later point), and results of the test can be saved to an html file, however these file formats are merely exemplary and do not limit the scope of the invention. Data received during testing can be forwarded to editors, figures, workspaces, and other file locations.

The testing tool GUI 852 includes a test explorer 854, which identifies a particular driver and interface to be used for a test. A test steps window 856 provides the user with the ability to define steps that can be added to the test explorer 854. The test steps window includes a property sweep operation, which enables the testing of all properties defined by the driver. A detail view 858 displays the property panels for the selected node and an output window for the test results. The detail view 858 allows users to define when the test step passes, e.g if the instrument did not error. There is a general test preferences dialog that the user can launch. This dialog allows users to define what happens if a test step fails, e.g. the test continues, the test stops, the instrument is reset and the test continues or the instrument is reset and the test stops.

There are additional pull down menus and help sections, as is conventional in a windows type GUI. A set property step panel 860 grants access to a set property test step, which provides users with a method for testing configuration of a specific property. The user can specify the property to configure, the object to configure, the value to which the property is configured, and when the test passes or fails. A similar GUI screen for the get property step enables the user to specify the property to query, the object to query, the output argument of the query, and when the test passes or fails. A similar GUI screen for test executing a function step enables the user to specify the function to execute, the object on which the function operates, the input arguments passed to the function, the output arguments of the function, and when the test passes or fails. The test can be saved along with a particular driver as a function executable by the user. In other words, the test can be saved as a method of the driver so that the user can then invoke the test from the device object at a later point in time.

The present invention described using the illustrative examples herein relates to a cross-platform interface tool that provides a common interface for any hardware or software component having the ability to advertise its features, input, and output requirements. The cross-platform interface tool automatically collects the requisite information and generates a device object for interfacing with the target hardware instrument, software application, or other component requiring control. An added feature of a testing mechanism provides the user with the ability to test various aspects of the interface and the execution thereof. Thus, the user can implement drivers of conventional and non-conventional formats without having to manually generate an interface.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. A method of testing a device interface object automatically created by a cross-platform interface tool, the device interface object for communicating with a component, the method comprising:
   identifying the device interface object and a driver associated with the component;
   receiving, from a user, a plurality of test steps;
   receiving, from a user, a pass requirement for a first test step;
   receiving, from a user, an action in response to a second test step failing, the action being one of continuing to run the plurality of test steps, stopping the plurality of test steps, resetting the component and continuing to run the plurality of test steps, and resetting the component and stopping the plurality of test steps;
   running each of the plurality of test steps;
   generating a plurality of test results, wherein
      the running includes determining if the first test step satisfied the received pass requirement and, in response to the second test step failing, executing the received action; and
   saving the plurality of test steps and the pass requirement as an executable function in the driver associated with the component.

2. The method of claim 1 further comprising saving the test in a file.

3. The method of claim 2 wherein the file is an eXtensible Markup Language (XML) file.

4. The method of claim 1 further comprising saving the plurality of test results in a file.

5. The method of claim 4 wherein the file is a HyperText Markup Language (HTML) file.

6. The method of claim 1 wherein at least one of the plurality of steps is a property sweep operation.

7. The method of claim 1 wherein the component is a hardware instrument.

8. A computer storage medium holding computer-executable instructions for testing a device interface object automatically created by a cross-platform interface tool, the medium comprising instructions for:
   identifying the device interface object and a driver associated with the component;
   receiving, from a user, a plurality of test steps;
   receiving, from a user, a pass requirement for a first test step;
   receiving, from a user, an action in response to a second test step failing, the action being one of continuing to run the plurality of test steps, stopping the plurality of test steps, resetting the component and continuing to run the plurality of test steps, and resetting the component and stopping the plurality of test steps;
   running each of the plurality of test steps;
   generating a plurality of test results, wherein
      the running includes determining if the first test step satisfied the received pass requirement and, in response to the second test step failing, executing the received action; and
   saving the plurality of test steps and the pass requirement as an executable function in the driver associated with the component.

9. The computer storage medium of claim 8 further comprising instructions for saving the test in a file.

10. The computer storage medium of claim 9 wherein the file is an eXtensible Markup Language (XML) file.

11. The computer storage medium of claim 8 further comprising instructions for saving the plurality of test results in a file.

12. The computer storage medium of claim 11 wherein the file is a HyperText Markup Language (HTML) file.

13. The computer storage medium of claim 8 wherein at least one of the plurality of steps is a property sweep operation.

14. The computer storage medium of claim 8 wherein the component is a hardware instrument.

* * * * *

UNITED STATES PATENT AND TRADEMARK OFFICE
CERTIFICATE OF CORRECTION

PATENT NO.         : 7,502,031 B1
APPLICATION NO. : 11/642431
DATED                 : March 10, 2009
INVENTOR(S)       : Melissa J. Pike et al.

It is certified that error appears in the above-identified patent and that said Letters Patent is hereby corrected as shown below:

At column 2, line 9 (Specification), of the printed patent, "components," should be --components--.

At column 2, line 23 (Specification), of the printed patent, "provide" should be --provides--.

At column 5, line 24 (Specification), of the printed patent, "cards," should be --cards--.

Signed and Sealed this

Nineteenth Day of May, 2009

JOHN DOLL
*Acting Director of the United States Patent and Trademark Office*